May 4, 1948.                A. VENDITTY                2,440,790
                   SELF-LOCKING SEPARABLE FASTENER
                   Filed Aug. 29, 1942        2 Sheets-Sheet 1
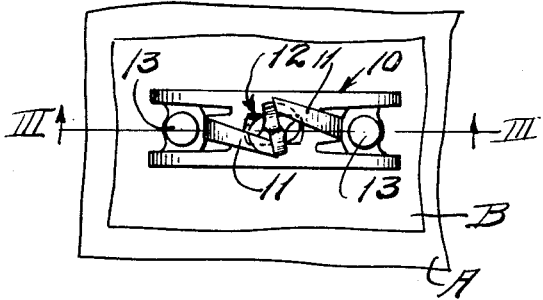
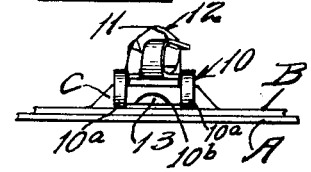
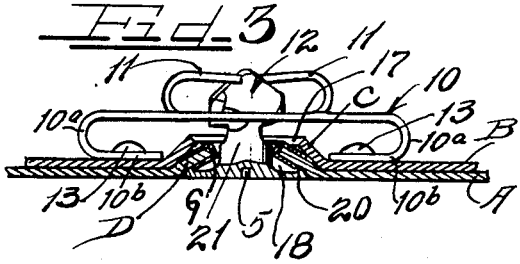
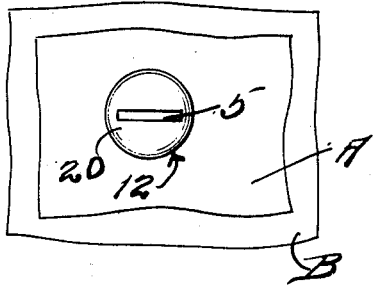
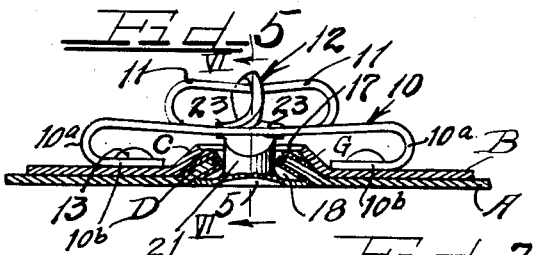
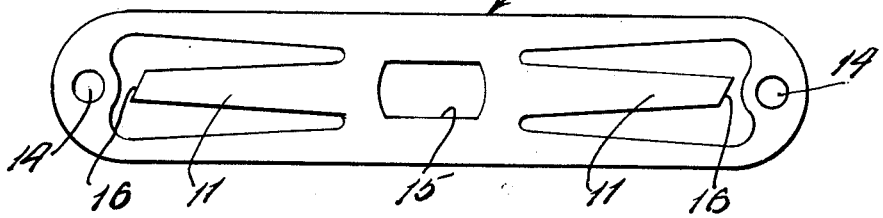
Inventor
Anthony Venditty
by Charles Hill
Attys.

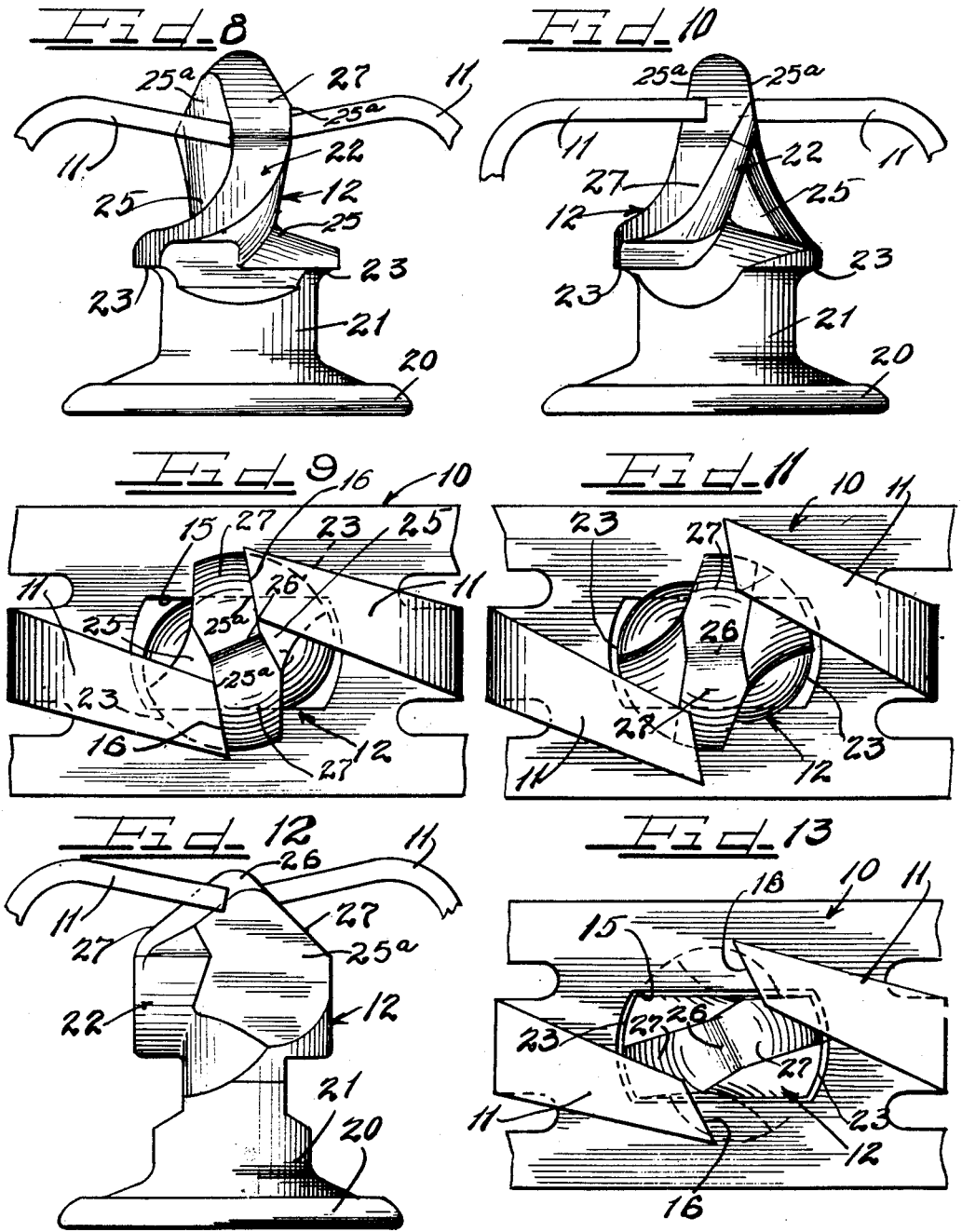

Patented May 4, 1948

2,440,790

UNITED STATES PATENT OFFICE 2,440,790

SELF-LOCKING SEPARABLE FASTENER

Anthony Venditty, Detroit, Mich., assignor to Thompson Products, Inc., a corporation of Ohio Application August 29, 1942, Serial No. 456,599

6 Claims. (Cl. 24—221)

This invention relates generally to fasteners and, more particularly, to a self-locking fastener for detachably connecting a plurality of parts, such as apertured plates, together.

More particularly, this invention relates to separable fasteners embodying means for preventing unauthorized or accidental detachment of the parts of the fastener and which fastener is particularly useful, therefore, in detachably connecting inspection plates on airplanes, airplane cowling, automotive paneling, and the like.

An object of this invention is to provide an improved fastener for detachably connecting a plurality of parts together and for retaining said parts in connected relation even though the assembly is subjected to extreme vibration normally tending to disconnect the parts.

Another object of the invention relates to the provision of a fastener of the type embodying a stud and a resilient receptacle in which the stud locks and unlocks upon a quarter turn or rotation of the stud, and which is provided with spring fingers for preventing unauthorized unlocking of the parts.

Still another object of the invention relates to the provision, in a fastener of the above mentioned type, fingers which must be torsionally stressed and spread apart by the stud through a cam action before they can become disengaged from locking engagement with the stud.

Yet another object of this invention relates to the provision of a novel form of stud for use in a fastener of the aforementioned character and which may be economically manufactured on a large production basis.

Still another and further object of the invention relates to the provision of a fastener embodying a spring clip-like receptacle and a rotary stud, shoulders on the stud for engaging a resilient portion of the receptacle upon turning of the stud to draw the parts being connected tightly together in retained relation and which stud and receptacle, in addition, have locking fingers adapted to be distorted both laterally and vertically through the instrumentality of novelly arranged cam surfaces on the stud.

In accordance with the general features of this invention, there is provided a fastener for connecting two members together comprising a resilient receptacle on one member and a stud connected to the other member and extending through openings in the two members and in the receptacle for cooperation with the receptacle to draw and fasten together said members, the receptacle having oppositely-disposed, spaced, resilient arms each having at its extremity an inclined edge spaced from the edge of the other arm, and said stud having a helical-like or threaded portion extending into the space between said edges and having an extremity provided with oppositely and downwardly inclined edge surfaces engageable by said inclined edges of said arms and upon turning of said stud spreading said arms laterally apart until they snap up over said stud edge surfaces and downwardly against opposite side abutments of said stud at substantially right angles to the plane of turning and against which said inclined edges of said arms abut to lock positively said stud and receptacle and to hold together under resilient tension said two members.

In accordance with other features of the invention, there is provided a stud for use in a fastener of the aforementioned characteristics and comprising a base for attachment to one part to be connected and a helical-like portion for extension through an opening in another part and terminating in a wedge-shaped extremity, said extremity having a central point on diametrically opposite sides of which are cam edges slanting in the direction of the base of the stud, the longitudinal sides of said helical portion being substantially parallel adjacent said cam edges for abutting cooperation with locking fingers on said other part.

Other objects and features of this invention will more fully appear from the following detailed description taken in connection with the accompanying drawings, which illustrate a single embodiment thereof, and in which:

Figure 1 is a plan view of my fastener in locked position showing it applied to two cooperable plates, which are illustrated as being broken away;

Figure 2 is an end view of the structure shown in Figure 1;

Figure 3 is a sectional view taken on line III—III of Figure 1 looking in the direction indicated by the arrows with the receptacle and a portion of the cooperable stud being shown in elevation, and also differing from Figure 1 in that the stud is shown in its unlocked position;

Figure 4 is a bottom view of the structure shown in Figure 1 and illustrating the position of a screwdriver slot in the stud when the stud is in its locked position;

Figure 5 is a sectional view similar to Figure 3 but showing the stud in its locking position;

Figure 6 is a sectional view, partly in elevation, taken on a line VI—VI of Figure 5 looking in the direction indicated by the arrows;

Figure 7 is a view of the stamping from which the spring receptacle is made, showing the condition of the stamping prior to the bending of the fingers and the ends of the stamping;

Figure 8 is an enlarged view of the stud showing its position with reference to the ends of the locking fingers when the stud is in locked position, the fingers being broken away and the base of the receptacle being omitted;

Figure 9 is a plan view of the structure shown in Figure 8 but illustrating more completely a portion of the receptacle to which the fingers are connected;

Figures 10 and 11 are views similar to Figures 8 and 9, respectively, but illustrating the positions of the stud and the fingers as the stud is being turned in a clockwise direction to unlock the fastener and showing how the fingers are spread apart during this operation;

Figure 12 is a view similar to Figures 8 and 10 but illustrating the fingers and the stud in a completely disengaged and unlocked position; and Figure 13 is a plan view similar to Figure 11 of the structure shown in Figure 12, showing the stud in its unlocked position as well as in a position in which it can be removed from the elongated aperture in the base of the receptacle.

As shown on the drawings:

The reference characters A and B designate generally two parts or plates, such as the cowling on an airplane, which are to be connected and locked together by my novel fastener. The upper plate B has supported on and fastened to it a resilient receptacle designated generally by the reference character 10 and which includes identical but oppositely-disposed spaced locking fingers or arms 11—11, which locking arms are cooperable with a central stud designated generally by the reference character 12 and connected to and supported by the lower plate A. The receptacle 10 is suitably secured as by means of rivets 13—13 to the surface of the upper plate B.

In Figure 7 I have illustrated, in flattened-out form, the metallic stamping from which the resillient receptacle 10 is made. This stamping, when in the flat, has at its opposite ends circular holes 14—14 through which the shanks of the fastening rivets 13—13 are adapted to extend. It will be perceived that end portions of this stamping are cut away to form the two fingers 11—11. Also, the intermediate portion of the stamping is provided with an elongated opening 15 and having flattened sides and grooved ends through which the shank of the stud 12 is adapted to extend.

In the formation of the receptacle, the arms 11 are suitably curved upwardly over the body of the receptacle so that their inclined or beveled extremities 16—16 are arranged in spaced relationship directly above the opening 15, as best shown in Figure 13.

Also, the end portions of the stamping are turned back under the main body of the stamping to provide curved or bowed leg portions 10a and base or feet portions 11b (Figs. 2, 3 and 5) for resiliently supporting the main body of the receptacle spaced from the surface of the plate B to which the receptacle is attached.

The stud 12 includes a flanged base 20 having on its under-surface a screwdriver slot 5, by means of which the stud may be turned a quarter of a turn in either direction depending upon whether the stud is being moved to locked or unlocked position. As best shown in Figures 8, 10, and 12, the stud has extending up from the base portion 20 a shank 21 formed at its upper end into a tip or helical-like portion 22. At the junction of the tip or helical-like portion 22 and the shank 21 proper are a pair of helical-like shoulders 23—23 which are of such limited circular extent as to be capable of being passed through the elongated aperture 15 (Figure 13) when the stud is moved to a completely unlocked position. When the stud is in its locked position, as best shown in Figure 9, these diametrically opposite shoulders 23—23 overlap the top surface of the body of the receptacle 10 and slightly deflect the body portion downwardly, as shown in Figure 5, so as to draw tightly together the parts or plates A and B.

At this time it should be noted that the shank 21 of the stud 12 is adapted to extend not only through the elongated aperture 15 of the receptacle 10 but also through apertures 17 and 18 in the plates A and B, respectively (Figures 3 and 5). These apertures 17 and 18 are defined by upwardly-formed annular, concentric ring portions C and D of the plates B and A, respectively. In other words, these cup portions C and D are arranged so that portion D can nest inside of portion C.

In addition, in order to prevent the stud from falling out of plate A when the stud is moved to its unlocked position, there may be provided on the upwardly-depressed portion D a grommet G of such a size as to engage under the shoulders 23—23 of the stud and hold the stud from falling out of the plate A.

My invention is particularly concerned with the construction of the helical-like portion 22 of the stud and the manner in which it lockingly cooperates with the beveled extremities 16—16 of the two spaced locking arms or fingers 11—11. I have found in my experimenting and development of fasteners of this type that unless a positive lock is provided, the tremendous vibration to which the parts of the fastener are subjected when the fastener is used in an airplane may result in the stud being jarred loose from its locked position. Accordingly, I have in my present invention provided a fastener wherein, as the stud is moved into its locked position or one wherein the spaced shoulders 23—23 thereof overlap the receptacle and draw the plates A and B together, the extremities of the locking fingers 11 are cammed apart in such a way that, when they finally snap into locking positions, they are disposed against abutments and are each locked at almost right angles to the direction of the plane of the finger.

In this construction, it will be perceived that the helical-like portion 22 of the stud has oppositely-arranged helical-like grooves 25—25 each being positioned directly above one of the shoulders 23. These grooves, in reality, provide double tapered threads diverging along helical paths outwardly toward the periphery of the shank portion to the extremities of the shoulders 23—23.

The other end or upper end, as viewed in Figures 8, 10, and 12, of the shank of the stud is provided with a wedge-shaped point 26 from which extend diverging wedge or cam surfaces 27—27 (Figure 12). These surfaces converge toward the point 26 but diverge in a direction toward the base 20 of the stud. Moreover, these wedge or cam surfaces 27—27 play a very important part in the camming apart of the beveled extremities 16—16 of the two fingers 11—11 upon rotation of the stud.

In the assembly of the fastening device, the two plates A and B are brought together with the two concentric apertured portions C and D in nested relation and with the shank of the stud extending upwardly through the hole 15 in the body of the receptacle 10. I have illustrated the position of the parts in this unlocked position of the fastener in Figures 3 and 13.

Thereafter, upon rotation of the stud in a counterclockwise direction, as viewed in Figure 13, the diametrically opposite shoulders 23—23 on the shank of the stud are brought out of alignment with the aperture 15 and progressively over the top surface of the body of the receptacle 10. This results in the stressing of the body portion of the receptacle 10 so that it becomes slightly bowed, as shown in Figure 5, and causes the two plates A and B to be tightly drawn toward and held against each other in stressed retained relationship.

At the same time that this action occurs, the novel locking feature of my invention comes into play through the instrumentality of the cooperation of the beveled ends 16 of the arms or fingers 11 with the helical-like upper portion 25 of the stud 12. More particularly, during the course of the rotation of the stud in counter-clockwise direction toward locked position, the beveled ends 16 of the arms 11 come into contact with the oppositely-inclined surfaces 27 of the wedge-like upper end of the stud. Continued rotary movement of the stud results in the transverse spreading or camming apart of the beveled ends of the two arms 16—16. In other words, these ends of the arms are torsionally twisted to a slight extent so as to increase the traverse space separating the beveled ends 16 of the arms. Continued turning of the stud opens up the gap between the arm ends 16 until these ends can snap over the edges 27 and downwardly along the opposite slightly inclined abutment surface sides 25a of the grooves 25—25. The taper of the bottom of each of the grooved portions 25 is such that the beveled end of the arm is deflected slightly in a direction toward the base 20 of the stud, as shown in Figure 8, wherein the arms are in locked position. By comparing Figure 8 with Figure 10, it will be perceived that in the process of unlocking the arms, they are straightened or raised to a slight extent. This slightly raising of the arms insures that the arms will not be forced downwardly or will not become so tightly wedged against the stud as to preclude unlocking of the fastener upon the application of sufficient turning force to the stud. Normally, however, the arms have a slight inclination, as shown in Figure 12, wherein the stud is in a completely unlocked position.

In Figure 9, it will be noted that the beveled ends 16—16 of the arms 11 fit rather flushly against the parallel grooved portions 25—25 of the stud. By comparing the illustration shown in Figure 9 with that shown in Figure 11, it will be apparent that the ends of the arms 11—11 must be transversely spread apart to a considerable extent during the operations of locking or unlocking the fastener. Considerable force is required to spread thusly the arms and, hence, once the arms are in the locking position shown in Figure 9, there is practically no likelihood of the stud being jarred loose, by vibration or otherwise, from its locked position. The plane of engagement between the beveled ends 16 of the arm 11 and the grooved portion 25 of the stud is almost at right angles to the direction of the turning of the stud.

Unlocking of the stud is effected in substantially the reverse order of the operations described in connection with the locking of the fastener. The progressive steps of the locking operation are apparent from Figures 8 to 13, inclusive.

It should also be noted that the rectangular hole 15 in the spring receptacle 10 has a width which is less than the maximum width of the stud through its shoulders 23—23 which feature precludes rotation of the stud beyond locked position.

Thus, it is clear from the foregoing description that not only do I provide a positive rotary means for anchoring the two plates together through the instrumentality of the circular shoulder portions 23—23 but, in addition, I provide positive locking abutments or side walls 25a of the grooves 25 to engage the arm ends 16 for resisting, at almost right angles to the direction of the turn of the stud, any tendency for the stud to move to an unlocked position by reason of vibration or the like. The fastener can only be unlocked when it is intended it should be, and even then it can only be unlocked by applying a relatively great force sufficient to torsionally twist or spread apart as well as slightly raise the resilient arms 11—11 to an extent sufficient to allow the wedge-like tip of the stud to pass between the space separating the ends of the arms.

It will, of course, be understood that various details of the invention may be varied through a wide range without departing from the principles of this invention and it is, therefore, not the purpose to limit the patent granted hereon otherwise than necessitated by the scope of the appended claims.

I claim as follows:

1. A fastener comprising an apertured receptacle, spring fingers on said receptacle having deflectable free end edges, a stud having a portion to be engaged in the aperture of the receptacle and also a portion rotatable over the receptacle to lock the receptacle to the stud, said stud having in addition a wedge-shaped extremity providing oppositely inclined edge surfaces over which said end edges of the fingers must pass in the locking or unlocking movement of the stud together with opposed side wall abutment surfaces engaged by said finger edges when they ride off of said inclined edge surfaces in the locking movement of the stud, said end edges of the fingers being spaced apart a distance less than the widest portion of the wedge-shaped extremity of the stud so as to require transverse torsional twisting of the fingers in the movement of the wedge-shaped extremity of the stud therebetween and whereby said fingers may positively lock the stud against accidental unlocking movement.

2. A fastener adapted for detachably connecting a plurality of apertured parts comprising a receptacle adapted to be fixedly mounted on the innermost part and having a stud-receiving aperture adapted to overlie the aperture of said innermost part in spaced relation therefrom, a spring finger on said receptacle having a deflectable free end edge, a stud adapted to be rotatably mounted in the aperture of the outermost part and having a portion rotatable into the aperture of the receptacle to deflect the aperture-defining receptacle portion toward the part apertures to draw the parts together, and an abutment surface on said stud adapted to abut said free end edge of said spring finger for holding the stud against unauthorized rotation, said stud also having a wedge-shaped extremity providing an inclined end surface over which the end edge of the spring finger must be raised and cammed during the locking and unlocking movements of the stud.

3. A fastener comprising a female member having an apertured central plate portion with laterally extending spring legs, feet on the ends of said legs for attaching the fastener to a part, a stud having a portion insertable in said aperture of the female part, said stud being adapted to be rotated into locking engagement with the female part while deflecting said spring legs, and spring fingers on said female part engageable with the stud to lock the stud against unauthorized rotation, said spring fingers having beveled end edges transversely spaced apart for a predetermined distance and said stud having an extremity the widest portion of which is of greater width than said distance so as to further separate transversely under stress said beveled end edges during locking and unlocking movements of said stud.

4. A fastener for connecting two members together comprising a receptacle on one member and a stud cooperating with the other member and extending through an opening in said first member as well as an opening in said receptacle and being rotatable for drawing together and retaining said members in engagement, said receptacle having oppositely-disposed spaced resilient arms each having at its extremity an edge spaced from the edge of the other arm to a given extent, said stud having a helical-like portion extending into the space between said edges and having an extremity provided with oppositely downwardly-inclined edge surfaces which transversely cam apart said arm edges upon turning of said stud until said edges snap over said stud edge surfaces, said stud having opposed side faces receiving the arm edges snapped over said stud edge surfaces in a direction approaching right angles to the direction of the turning of said stud to lock said stud and receptacle together under tension.

5. A fastener comprising an apertured receptacle, spring fingers on said receptacle having deflectable free end edge portions, a stud having a portion to be engaged in the aperture of the receptacle and also a portion rotatable over the receptacle to lock the receptacle to the stud, said stud having in addition a wedge-shaped extremity providing oppositely inclined surfaces over which said fingers must pass in the locking or unlocking movement of the stud, said fingers being spaced apart a distance less than the widest portion of the wedge-like end of the stud so as to require transverse torsional twisting of the free end edges of the fingers in the movement of the wedge-like part of the stud therebetween, the vertical sides of said wedge end of the stud being formed substantially parallel and flat but with a slight taper so as to lift slightly the free end edges of said fingers toward said inclined surfaces in the rotation of the stud and whereby said fingers may positively lock the stud against accidental unlocking movement.

6. In a fastener, a female member, and a rotatable male member insertable therein, said male member having shoulders rotatable on and over a portion of the female member to connect the members together and also having a tip, said female member having spaced locking arms with resilient free end edge portions having endwise engagement with opposite side portions of said tip, said tip upon rotation of said male member slightly raising each of said free portions over an outer edge of said tip whereby said arms may be moved under force from unlocked and locking positions.

ANTHONY VENDITTY.

REFERENCES CITED

The following references are of record in the file of this patent:

UNITED STATES PATENTS

| Number | Name | Date |
| --- | --- | --- |
| 2,054,519 | Dzus | Sept. 15, 1936 |
| 2,174,030 | Boyer | Sept. 26, 1939 |
| 2,183,085 | Richardson | Dec. 12, 1939 |
| 2,204,829 | Shippee et al. | June 18, 1940 |
| 2,205,863 | Rauch et al. | June 25, 1940 |
| 2,252,286 | Hathorn | Aug. 12, 1941 |
| 2,276,694 | Henry | Mar. 17, 1942 |
| 2,285,661 | Hryzack | June 9, 1942 |
| 2,307,132 | Hufferd | Jan. 5, 1943 |
| 2,309,737 | Murphy | Feb. 2, 1943 |